United States Patent [19]

Lange

[11] 4,234,991
[45] Nov. 25, 1980

[54] STRIP OF FASTENING ELEMENTS SUCH AS NAILS

[75] Inventor: Wilfried Lange, Altenhagen, Fed. Rep. of Germany

[73] Assignee: Fa. Dieter Haubold Industrielle Nagelgeräte, Hemmingen-Westerfeld, Fed. Rep. of Germany

[21] Appl. No.: 956,453

[22] Filed: Oct. 31, 1978

[30] Foreign Application Priority Data

Oct. 31, 1977 [DE] Fed. Rep. of Germany ....... 2748862

[51] Int. Cl.$^3$ ....................... F16B 15/02; F16B 15/08
[52] U.S. Cl. ......................................... 10/28; 206/343
[58] Field of Search ..................... 85/28, 10 R, 17, 18, 85/10 E, 29; 206/343, 345, 346, 347, 344; 10/54; 151/41.7

[56] References Cited

U.S. PATENT DOCUMENTS

| 455,362 | 7/1891 | Servis | 85/28 |
|---|---|---|---|
| 3,348,669 | 10/1967 | Powers | 85/17 |
| 3,373,646 | 3/1968 | Ehlert | 85/17 X |
| 3,435,871 | 4/1969 | Johnson | 151/41.7 |
| 3,645,164 | 2/1972 | Wurth | 85/17 |
| 3,756,391 | 9/1973 | Keck et al. | 206/343 |
| 3,835,991 | 9/1974 | Brecht | 85/28 X |
| 4,040,325 | 8/1977 | Monacelli | 206/343 X |

*Primary Examiner*—Ramon S. Britts
*Attorney, Agent, or Firm*—Allison C. Collard; Thomas M. Galgano

[57] ABSTRACT

In a strip of nails or like fastening elements for use in a nail or like driving machine the heads of the elements are inclined at an angle of about 15° to the plane normal to the axis of the element so that the heads of adjacent elements can overlap and be welded together when the elements are assembled into a flat strip.

8 Claims, 2 Drawing Figures

STRIP OF FASTENING ELEMENTS SUCH AS NAILS

This invention relates to a strip formed by a series of adjoining nails or other fastening elements for use in a suitable driving machine.

Several suggestions and satisfactory solutions have been proposed for the construction of strips of adjoining fastening elements, in particular nails, staples, pins or screws for the use in mechanical driving machines. Due to the width of the heads of nails, however, it has hitherto not been possible to arrange the shanks of nails close enough together side by side, without any intervening gap. In order to reduce the distance between the adjacent nail shanks, the nails can be placed side by side in such a manner that their heads overlap in the manner of roofing tiles. Such overlap results in the points of the nails being staggered relatively to each other, with adjacent nail points displaced relative to each other by at least the thickness of the nail head. Such a strip of staggered nails requires an especially designed nail driving machine with substantial overall height.

Another way of avoiding gaps between the shanks of adjacent nails in a strip of nails is to give the nail heads a special shape. This, however, results in an impact area of the nail head of reduced size and of partially asymmetrical shape, which is undesirable. Examples of nail strips of this kind are to be found in German Specifications DT-PS No. 1 808 604, DT-AS No. 2 250 375, and DT-GM No. 1 678 559, and in U.S. Pat. No. 3,361,526.

An example of one such known nail strip has nail heads which are truncated on both sides flush with the sides of the nail shank in order to make it possible for the nail shanks to lie directly side by side without staggering of the nail points relative to each other. Such truncating of the nail heads on two sides results, however, in a considerable reduction in the impact area of the nail head. Also, the nail head does not fully conceal the hole made by the nail when the latter has been driven home, rendering the nail unsuitable for many purposes.

The object of the present invention is to provide a strip of fastening elements in which the gaps between the shanks of adjacent elements are smaller than the diameters of the heads of the elements and in which the points of all nails lie on a straight line perpendicular to the longitudinal axes of the elements.

The invention accordingly provides a strip of adjoining fastening elements for use in a nail or like driving machine, in which the elements are arranged parallel to each other with the heads of adjacent elements overlapping, each head lying in a plane inclined to the plane perpendicular to the longitudinal axis of the respective fastening element. Preferably the inclination of the heads to the plane perpendicular to the shanks of the elements is 15°.

There are several ways in which the fastening elements can be joined together. Thus the heads may be glued together, they can be soldered or welded together, or the shanks of the fastening elements can be connected together. In the case where the fastening elements are glued together, it is particularly advantageous to provide the shanks of the elements with spacer tongs which abut adjacent shanks to maintain the shanks parallel to each other and spaced apart by a predetermined spacing.

By using fastening elements with inclined heads in accordance with the invention it is possible to construct strips in which the points of all the elements lie in the same plane perpendicular to the shanks of the elements without the gaps between adjacent shanks being equal to, or indeed larger than, the width of the heads, so that there is no restriction as to the shape of the fastening element head, which can be of any of the standard commercial shapes.

The welding together of fastening element heads has a particular advantage, because by this means the strip exhibits a greater rigidity without limiting its use in a driving machine. Preferably each fastening element head is provided with a protuberance on its underside which in the strip forms a resistance weld between the head and an overlapped head of an adjacent fastening element. The resistance welding together of the heads enables a simple and clean method of fabrication of the strip without any additional accessories such as welding electrodes or carrier wires.

A nail strip in accordance with this invention can be used in a nail driving device of low overall height since, despite inclination of the nail heads, the heads are nested with adjacent heads, thereby ensuring that the nail points lie in a common plane perpendicular to the nail shanks.

A nail strip according to one embodiment of this invention will now be described by way of example, with reference to the accompanying purely diagrammatic drawings, in which.

The nail strip according to the illustrated embodiment of the invention is made up of a number of parallel nails 1, having heads 2 which in the example shown are flat heads. Each nail head 2 is inclined at an angle of substantially 15° to the normal plane of a traditional flat nail head, that is, perpendicular to the longitudinal axis of the nail.

Figure 1:
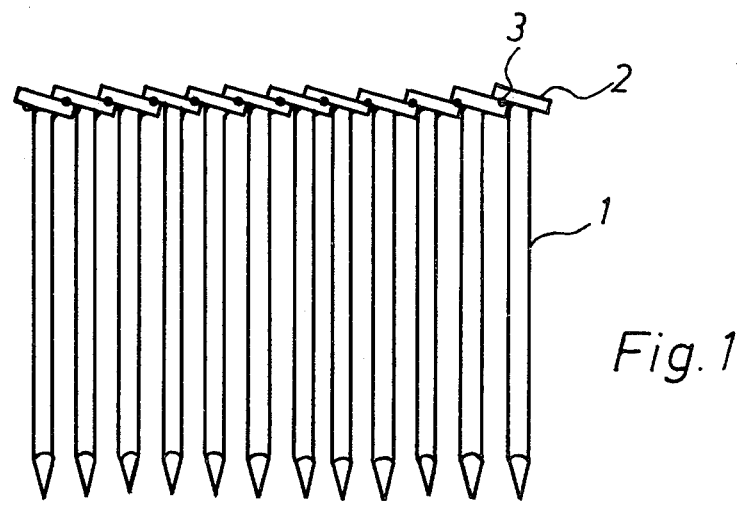
FIG. 1 is a side elevation of the nail strip.

The inclined nail heads 2 of adjacent nails 1 overlap each other like roofing tiles when the nails 1 are arranged side by side in a strip with their shanks parallel to each other, as shown in FIG. 1.

Figure 2:
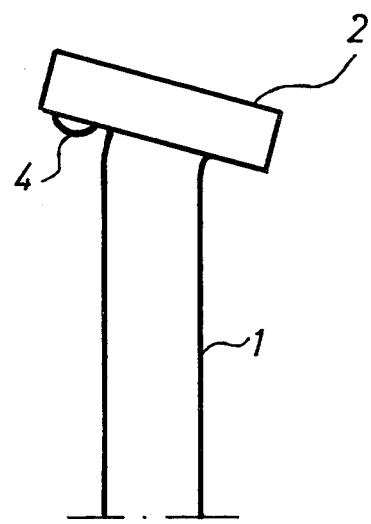
FIG. 2 is a side elevation on an enlarged scale of one of the nails forming part of the nail strip shown in FIG. 1.

The overlapping nail heads 2 are joined together by spot welds 3 which are effected by resistance welding. On the underside of each nail head 2 a small protuberance 4 of hemispherical shape is formed, at the same time as the nail itself if formed. The protuberance 4 is formed on the underside of the nail head 2, on the highest point of the nail head when the nail 1 is vertical with the head uppermost (FIG. 2). The protuberances 4 form the spot welds 3 interconnecting overlapping nail heads 2 when welding current is passed between the overlapping nail heads 2 through the protuberances 4.

The overlapping of the inclined nail heads 2 allows the nail heads 2 to be nested together with the shanks of the nails 1 spaced apart by gaps which are narrower than the width of each nail head 2. The points of the nail 1 all lie on a straight line perpendicular to the longitudinal axes of the nails 1.

The nail strip is loaded into a nail driving machine so that successive nails, starting from the left of the strip shown in FIG. 1, can be detached from the strip and driven into work in the usual way. The initial impact on the nail head ruptures the weld 3 and detaches the nail from the strip, subsequent impacts straightening out the nail head 2, so that by the time the nail 1 has been driven fully home the nail head 2 is perpendicular to the shank of the nail.

Although shown flat in FIG. 1, the nail strip can be rolled up spirally in order to form a compact roll for storage. For this purpose the nails of the nail strip may ideally be glued together elastically.

I claim:

1. A nail comprising a shank and a deformable head at one end of the shank, the nail head lying in a plane inclined to the plane perpendicular to the longitudinal axis of the nail shank, for attachment to adjacent like nails to form a nail strip, the angle of inclination of said head of said nail being so chosen that upon subsequent driving impacts said head is straightened such that it lies substantially in a plane perpendicular to the shank of the nail, and attachment means on the underside of said head at the higher end thereof.

2. A strip of adjoining fastening elements for use in a fastener-driving machine comprising:
a multiplicity of interconnected, successively-arranged fastening elements, each of which has a shank having a head at one end thereof and a driving tip at the other end thereof, each of said heads of said fastening elements lying in a plane inclined at an angle of about 15° to a plane disposed perpendicular to the longitudinal axis of the respective fastening element, said fastening elements being arranged and secured to one another such that said shanks thereof are substantially parallel to one another, the heads of adjacent fastening elements overlap one another and said driving tips thereof lie substantially in a common plane perpendicular to the longitudinal axes of said fastening elements.

3. A strip of adjoining fastening elements for use in a fastener-driving machine comprising:
a multiplicity of interconnected, successively-arranged fastening elements, each of which has a shank having a head at one end thereof and a driving tip at the other end thereof, each of said heads of said fastening elements lying in a plane inclined at an angle to a plane disposed perpendicular to the longitudinal axis of the respective fastening element, said fastening elements being arranged and secured to one another such that said shanks thereof are substantially parallel to one another, the heads of adjacent fastening elements overlap one another and said driving tips thereof lie substantially in a common plane perpendicular to the longitudinal axes of said fastening element, the angle of inclination of said heads of said fastening elements being so chosen that upon subsequent driving impacts said head is straightened such that it lies substantially in a plane perpendicular to the shank of the fastening element.

4. A strip as defined in claim 2 or claim 3, wherein the elements are glued together.

5. A strip as defined in claim 2 or claim 3, wherein the elements are welded together.

6. A strip as defined in claim 2 or claim 3, wherein the overlapping heads of adjacent fastening elements are welded together.

7. A strip as defined in claim 6, wherein each head is provided with a protuberance on its underside which in said strip forms a resistance weld between the head and an overlapped head of an adjacent fastening element.

8. A strip as defined in claim 2, wherein the strip is flexible in the direction perpendicular to the shanks, enabling the strip to be wound spirally into a roll.

* * * * *